United States Patent Office 3,002,921
Patented Oct. 3, 1961

3,002,921
HYDROFORMING CATALYST AND PROCESS
Elroy Merle Gladrow and Charles Newton Kimberlin, Jr., Baton Rouge, La., assignors to Esso Research and Engineering Company, a corporation of Delaware
No Drawing. Filed Dec. 10, 1958, Ser. No. 779,294
6 Claims. (Cl. 208—138)

This application relates to novel platinum group metal catalysts and to a method employing said catalysts for hydroforming naphtha fractions to produce high octane number motor fuels. More particularly this invention pertains to novel platinum group metal catalysts, preferably platinum per se upon alumina supports which are activated by the incorporation of relatively small amounts of an activator substance.

Platinum catalysts are well known and widely used for the treatment of hydrocarbon fractions boiling in the motor gasoline range under hydroforming reaction conditions in order to produce high octane number, clean-burning gasolines. In view of the high costs of platinum-alumina hydroforming catalysts it is necessary, to compete economically, that such catalysts have high activity so that large amounts of naphtha feed can be charged to a given conversion unit per unit of time. These catalysts must, in addition to high activity, also possess good selectivity or be able to produce high yield of high octane number products with small production of normally gaseous or solid carbonaceous by-products. It is also necessary that these catalysts possess good stability so that they retain good activity and selectivity characteristics during prolonged periods of operation and, when necessary, that they be capable of regeneration by burning carbonaceous deposits therefrom and treating the essentially carbon-free catalyst with oxygen-containing and/or chlorine containing gas.

It has been previously proposed to add activators or promoters to hydroforming catalysts consisting of platinum dispersed or supported upon a carrier. U.S. Patent No. 2,814,599, for example, proposes to add a compound of a group III metal having an atomic number of at least 21 and not more than 89. Within this group of compounds it has been found that gallium effects a substantial activation of a platinum-alumina catalyst while yttrium actually deactivates the catalyst. This serves again to point up the empirical nature of catalysis and the unpredictability of the effects of added components upon particular catalyst compositions.

It has now been found that the activity of platinum-alumina hydroforming catalyst systems is markedly enhanced by the incorporation of from 0.1 to 5% by weight of praseodymium oxide into the composite. This is quite surprising and unexpected since other rare earth metal oxides specifically ceria, yttrium (which is rare earthlike in its chemistry), and mixed samarium and gadolinium oxide, have a deactivating effect upon fresh platinum-alumina catalysts. The improvement in activity by the addition of praseodymium oxide is achieved without loss in product quality or yield.

The platinum-alumina catalysts which are activated in accordance with the present invention may be prepared in a variety of ways known to the art. For example, alumina sol, alumina gel, hydrated aluminas or activated or adsorptive aluminas in the form of gamma and/or eta alumina may be composited with a suitable platinum group metal compound such as chloroplatinic acid, ammonium chloroplatinate, chloropalladic acid, platinum sulfide or the like. It is preferred to prepare the platinum-alumina catalyst by preparing eta alumina from aluminum alcoholate by hydrolyzing in cold water, preferably with small amounts of ammonia, aging the hydrolyzate to convert the hydrous alumina substantially completely to beta alumina trihydrate, drying and calcining at about 1000–1400° F. to convert the hydrated alumina to eta alumina which is then impregnated with a solution of chloroplatinic acid. The catalysts contain the usual amounts of platinum group metals, for example, 0.01 to 5.0 wt. percent, preferably about 0.05 to about 0.75 wt. percent platinum.

The addition of the praseodymium oxide can be effected before, during or after the addition of the platinum compound. It is preferred to add the praseodymium as a soluble salt, preferably as the chloride by incorporating the same in the chloro-platinic acid impregnating solution. The praseodymium may also be added as the acetate, the nitrate or the halide with the chloride preferred. The amount of praseodymium compound added should be sufficient to provide from 0.1 to about 5.0 wt. percent praseodymium oxide in the composite. After completion of the impregnation, the catalyst is heated or calcined at about 1000 1200° F. for several hours. The catalyst is desirable given a short treatment with hydrogen before use in the reforming of hydrocarbon fractions. This is conveniently effected by bringing the catalyst up to conversion conditions of temperature and pressure in the presence of a hydrogen-rich gas.

The catalysts prepared in accordance with the present invention are particularly adapted for reforming hydrocarbon fractions boiling in the naphtha boiling range or from about 150–200° F. to about 400° F. The reforming can be effected in fixed, moving or fluidized beds. In the latter case, it is preferred to use a dilute catalyst prepared by first preparing a catalyst concentrate by compositing about 0.2 to 1.0 wt. percent platinum and about 0.5 to 4.0% praseodymium oxide with finely divided active alumina, i.e. having a particle size smaller than about 100–125 microns and then mixing one part of this catalyst concentrate with more than an equal amount, for example about nine parts of finely divided unplatinized calcined adsorptive alumina.

Reforming of naphtha feed is effected by contacting feed naphtha in the vapor phase with the catalysts of this invention at temperatures between about 800 to 1000° F., pressures of from 100 to 1000 p.s.i.g. at hourly weight space velocities of about 0.5 to 10 and in the presence of from about 2000 to 10,000 s.c.f. of hydrogen or hydrogen-rich recycle gas per barrel of liquid feed. It is preferred to utilize this catalyst in essentially a non-regenerative operation, i.e., at about 450 p.s.i.g. pressure and higher.

The following examples are illustrative of the present invention.

*Example 1*

Beta alumina trihydrate was prepared by the hydrolysis of aluminum alcoholate in room temperature water followed by aging for 40 hours. The slurry was filtered, the alumina cake oven dried at 250° F., and then calcined 16 hours at 1000° F to convert the hydrate to eta alumina.

Fifty grams of the calcined alumina were impregnated with 50 cc. of a solution comprising 0.15 g. Pt (as $PtCl_4$). The catalyst paste was left standing at room temperature for 3 hours and then oven dried and calcined for 4 hrs. at 1000° F. This catalyst comprises 0.3% Pt—99.7% $Al_2O_3$. One part by weight of this catalyst was physically mixed with 9 parts of alcoholate alumina gel which had been previously heated at 1500° F. for 24 hours, to make a composite dilute platinum catalyst system which was then heated for 16 hrs. at 1000° F. This represents the standard reference catalyst and is designated catalyst "A" in Example 4 (below).

The alcoholate alumina gel was made by hydrolyzing one volume of aluminum alcoholate solution (10 wt. percent solids as $Al_2O_3$) in three volumes of a 1% acetic acid solution at about 80° F. The hydrolyzed mixture is allowed to settle and the lower aqueous alumina sol layer withdrawn and stripped of remaining organic materials by blowing with steam. The resulting alumina hydrosol comprises about 3.3% $Al_2O_3$ and is then spray dried to form microspheres of alpha alumina monohydrate. After calcining this material at 1500° F. for 16 hours, eta alumina is formed.

*Example 2*

Beta-$Al_2O_3 \cdot 3H_2O$ was prepared as described in Example 1, and calcined 16 hours at 1000° F. Fifty grams of the calcined alumina were impregnated with 50 cc. of a solution comprising 0.15 g. Pt (as $PtCl_4$) and 1.0 gr. $Pr_2O_3$ (as $PrCl_3$). The catalyst paste was left to stand at room temperature for 3 hours, and then oven dried and calcined for 4 hrs. at 1000° F. This catalyst comprises 0.3% Pt—2.0% $Pr_2O_3$—97.7% $Al_2O_3$. One part by weight of this material was physically mixed with 9 parts alcoholate alumina gel which had been calcined previously at 1500° F. for 24 hours, to make a composite dilute platinum catalyst system which was then heated for 16 hours at 1000° F. This catalyst is designated catalyst "B" in Example 4 (below).

*Example 3*

Beta-$Al_2O_3 \cdot 3H_2O$ was made and calcined as described in Example 1. Fifty grams of the calcined alumina were impregnated with 50 cc. of a solution comprising 0.15 g. Pt (as $PtCl_4$) and 1.0 g. $Y_2O_3$ (as $YCl_3$). Left to stand 3 hours at room temperature and then dried and calcined for 4 hours at 1000° F. This catalyst comprises 0.3% Pt—2.0% $Y_2O_3$—97.7% $Al_2O_3$. One part by weight of this material is physically mixed with 9 parts alcoholate alumina gel which had been calcined previously at 1500° F. for 24 hours to make a composite dilute platinum catalyst system which was then heated for 16 hours at 1000° F. This catalyst is designated catalyst "C" in Example 4 (below).

*Example 4*

Catalyst systems "A," "B," and "C" were tested in a hydroforming operation at 910° F., 200 p.s.i.g. pressure 2400 c.f./b. added hydrogen, feeding a heavy virgin naphtha. The results are tabulated below.

| Catalyst | "A" | "B" | "C" |
|---|---|---|---|
| Octane Number, Res. Clear | 95.0 | 95.0 | 95.0 |
| Feed rate, W./Hr./W | 1.30 | 1.92 | 0.79 |
| $C_5$+Yield, Vol. percent | 84±1.0 | 83.6 | 82.1 |

The data show that catalyst "B," the catalyst of this invention, shows about 50% more activity than catalyst "A," the standard reference catalyst, and with no loss in selectivity. The effect appears to be a property of the praseodymium oxide only, which was added as a promoter and not to the fact it is a rare earth. Yttrium oxide ($Y_2O_3$) is rare earthlike in its chemistry and the data show it to actually deactivate the catalyst system.

*Example 5*

Beta alumina trihydrate was made and calcined as described in Example 1. Three hundred grams of the calcined alumina were impregnated with 300 cc. of a solution comprising chloroplatinic acid equivalent to 1.8 grams Pt. The resulting catalyst paste was oven dried and calcined 4 hours at 1100° F. This catalyst comprises 0.6% Pt—99.4% eta-$Al_2O_3$ and is designated catalyst "D."

*Example 6*

Beta alumina trihydrate was made and calcined as described in Example 1. Three hundred grams of this calcined alumina were impregnated with 300 cc. of a solution containing chloroplatinic acid equivalent to 1.8 gr. Pt and a mixture of samarium and gadolinium chlorides equivalent to 6.0 grams of the mixed rare earth oxides. The samarium and gadolinium mixture comprises about equal amounts of these two rare earths. The resulting catalyst paste was oven dried at 250° F. and calcined 4 hours at 1100° F. This catalyst comprises about 0.6% Pt—2.0% $(Sm-Gd)_2O_3$—97.4% eta-$Al_2O_3$ and is designated catalyst "E."

*Example 7*

Catalysts "D" and "E" were tested in a hydroforming operation at 910° F., 200 p.s.i.g. pressure, 2200 c.f./b. added hydrogen, feeding a heavy virgin naphtha. The results are tabulated below and compared at the 95.0 Research Octane Number level.

| Catalyst | "D" | "E" |
|---|---|---|
| Octane No., Res. Clear | 95.0 | 95.0 |
| Feed rate, W./Hr./W | 6.8 | 4.9 |
| $C_5$+Yield, Vol. percent | 85.0 | 85.0 |

These data show that compared to the unpromoted Pt-$Al_2O_3$ catalyst "D," the $(Sm-Gd)_2O_3$ present in catalyst "E" does not act as an activity promoter, but as a suppressant. This illustrates that praseodymium acts as a promoter in its own right and not because it is a rare earth, as samarium and gadolinium are also rare earths and are de-activators as seen above. Also yttrium, which is a group III metal and rare earthlike in its chemistry does not exhibit the promotional effects as does praseodymium.

While the above data show the superiority of our catalyst in a dilute platinum system, similar effects are obtained when added directly to Pt-$Al_2O_3$ catalyst on the alumina in which the Pt is composited.

The foregoing specification discloses a preferred embodiment of the present invention. It will be understood that numerous variations are possible within the scope of the following claims without departing from the spirit of this invention.

What is claimed is:

1. A reforming catalyst composition consists essentially of from about 0.01 to 5.0 wt. percent of a platinum group metal in combination with from 0.1 to 5.0 wt. percent of praseodymium oxide supported on an adsorptive alumina carrier.

2. A reforming catalyst composition consists essentially of from 0.01 to 1.0 wt. percent of platinum in combination with from 0.1 to 5.0 wt. percent of praseodymium oxide supported on an adsorptive alumina carrier.

3. The catalyst as defined in claim 2 in which the carrier is eta alumina derived from aluminum alcoholate.

4. A reforming catalyst composition consists essentially of from about 0.01 to 5.0 wt. percent of a platinum group metal in combination with from 0.1 to 5.0 wt. percent of praseodymium oxide supported on an adsorptive alumina carrier having a particle size smaller than about 100–125 microns intimately mixed with more than an equal quantity of finely divided adsorptive alumina free from platinum group metals.

5. A reforming catalyst composition consists essentially of from 0.01 to 1.0 wt. percent of platinum in combination with from 0.1 to 5.0 wt. percent of praseodymium oxide supported on an adsorptive alumina carrier having a particle size smaller than about 100–125 microns intimately mixed with more than an equal quantity of finely divided adsorptive alumina free of platinum.

6. The process of reforming hydrocarbons boiling in the naphtha boiling range which comprises contacting the naphtha vapors with a catalyst consists essentially of from about 0.01 to 5.0 wt. percent of a platinum group metal in combination with from about 0.1 to 5.0 wt. percent of praseodymium oxide supported on an adsorptive alumina carrier at temperatures of 800 to 1000° F. pressures of 100 to 1000 p.s.i.g. in the presence of from 2000 to 10,000 c.f./b. of hydrogen for a period sufficient to substantially improve the octane number of the naphtha.

References Cited in the file of this patent

UNITED STATES PATENTS

| | | |
|---|---|---|
| 2,152,908 | Morrell et al. | Apr. 4, 1939 |
| 2,337,190 | Greensfelder et al. | Dec. 21, 1943 |
| 2,690,457 | Hackmann | Sept. 28, 1954 |
| 2,814,599 | Lefrancois et al. | Nov. 26, 1957 |

OTHER REFERENCES

Moeller: "Inorganic Chemistry," published by Wiley (1952), pp. 891 and 151.